UNITED STATES PATENT OFFICE.

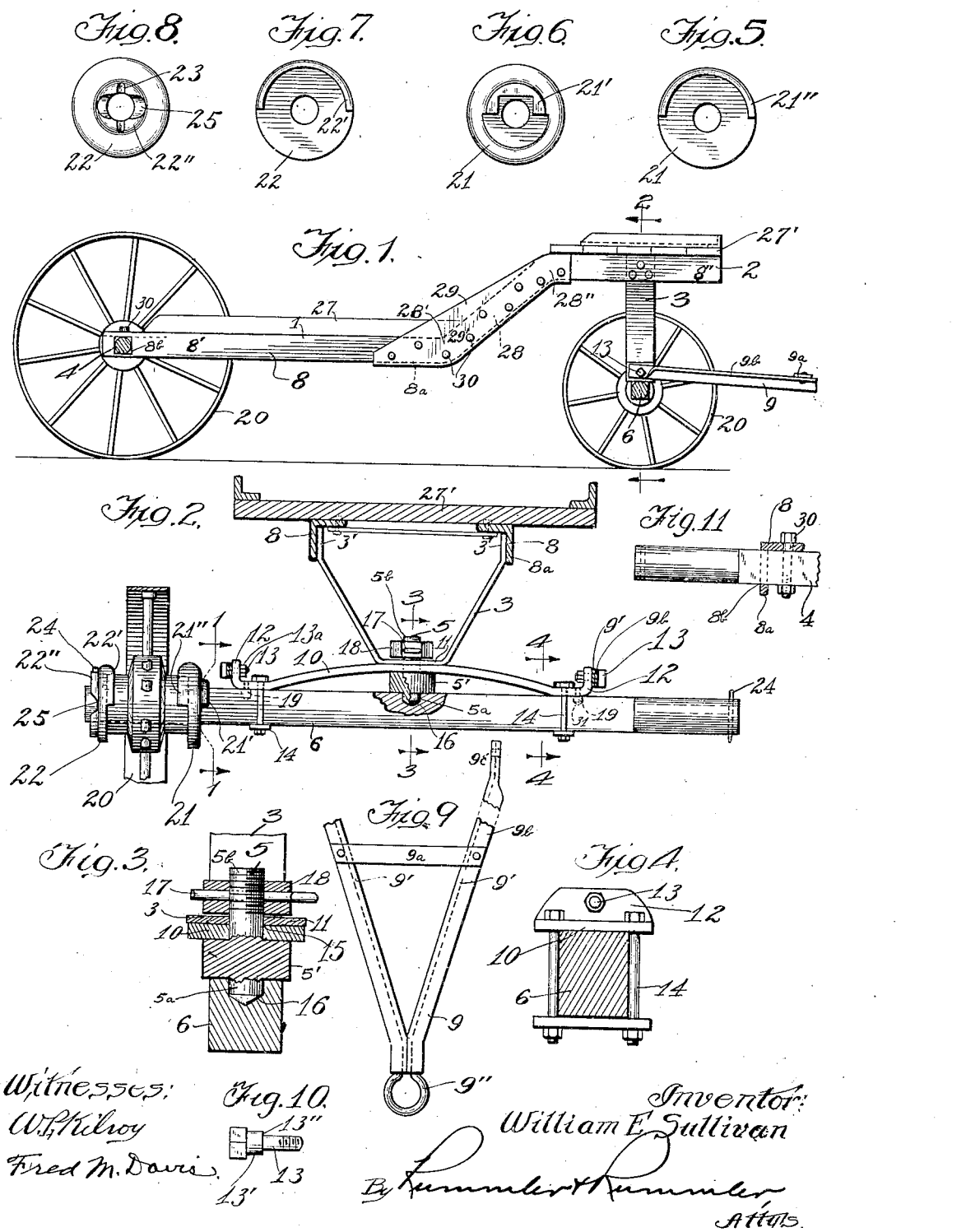

WILLIAM E. SULLIVAN, OF ROODHOUSE, ILLINOIS.

TRUCK.

1,351,808.     Specification of Letters Patent.     Patented Sept. 7, 1920.

Application filed July 29, 1918. Serial No. 247,210.

*To all whom it may concern:*

Be it known that I, WILLIAM E. SULLIVAN, a citizen of the United States of America, and a resident of Roodhouse, county of Greene, and State of Illinois, have invented certain new and useful Improvements in Trucks, of which the following is a specification.

This invention relates to wagons or trucks and mainly to wagon body frames having a relatively high or elevated front part adapted for short turning. The main objects of the invention are to provide a wagon or truck of the character described, having an improved form of drop frame adapted to provide a low short-turning body of great strength; to provide an improved form of tongue and tongue attachment adapted particularly to serve as a trailer connection; to provide in a truck such as referred to an improved form of king-pin and fifth wheel bearing; and to provide in such a device an improved form of hub-cap and dust protector for the wheels.

An illustrative embodiment of the invention is shown in the accompanying drawings, in which—

Figure 1 is a side view of the truck.

Fig. 2 is a section at 2—2 of Fig. 1.

Fig. 3 is an enlarged section at 3—3 of Fig. 2.

Fig. 4 is an enlarged section at 4—4 of Fig. 2.

Fig. 5 is a view of the hub face of an inner hub-cap.

Fig. 6 is a view of the reverse side thereof.

Fig. 7 is a view of the hub face of an outer hub-cap.

Fig. 8 is a view of the reverse side thereof.

Fig. 9 is a plan of the front part of the tongue.

Fig. 10 shows a tongue pivot bolt.

In the embodiment shown in the drawings, the truck body comprises a drop frame 1, the front part 2 of which is elevated and supported on a downwardly projecting bracket or bolster 3, the opposite end or main body part being mounted directly on the rear axle 4.

Said bracket 3 is substantially U shaped, with a flat middle part and with its arms somewhat divergent. It is connected centrally by the king-pin 5 to the front axle 6 and fifth wheel device. The upper ends 3' of the bolster arms are secured to the side bars or sills 8 of the body frame.

The fifth wheel device is combined with or includes means for attaching the truck tongue 9 and comprises a long rectangular bar 10 preferably of rectangular cross section bowed up centrally to receive the lower bearing part 11 of the bolster 3. The tips of said bar are turned vertically upwardly at 12 to receive the horizontal pivots or bolts 13 for the truck tongue. Said bar 10 is secured to the axle adjacent to its ends just within the upturned tips by means of clamps 14 which may be in the form of bolts and cross bars or in the form of U bolts as understood in the art. Said bracket 3 and bar 10 are apertured at 15 in registry with the center of the axle 6, which also has a depression or aperture 16 in alinement with said apertures to receive the king-pin, said pin having a rigidly tight driven fit with respect to said aperture 16. The bolster bracket is secured in place on said bar 10 and pin 5 by means of a cotter pin 17 and threaded nut 18 secured to the upper end of the king-pin. Said king-pin comprises a relatively thick middle part 5' and oppositely projecting tips 5$^a$ and 5$^b$, one disposed downwardly to fit in aperture 16 and the other being threaded and disposed upward to receive the nut 18. The thick part 5' serves as a bearing or filler block between the axle 6 and bar 10 and helps support the latter. Dowels 19 having a tight driven fit supplement the fastenings 14 for securing the bar 10 rigidly on the axle 6.

The said bolts 13 are adapted to receive the rear ends of the arms or hounds 9' of the forked tongue or trailer connection 9 in pivotal relation so as to permit swinging of said tongue in a vertical direction. Each bolt 13 comprises a head and a shank part, the latter being enlarged at 13' adjacent to the head and provided with a shoulder at 13''. This assures a free turning fit for the tongue at 13' when the nut 13$^a$ is set. Said tongue is provided on its front end with a ring-like connection 9''. It is provided with a medial brace 9$^a$. The branches 9' are of angle bar form. At the rear end the top flange 9$^b$ is bent down against the opposite flange and both flanges are perforated at 9$^c$ to receive the bolt 13.

The four wheels 20 are secured in place at the ends of the front and rear axles each by means of a pair of hub-caps 21 and 22, inner and outer respectively. The main body of each axle is rectangular in cross section, and the ends are cut away and rounded as usual in axles.

The inner cap 21 is formed on its upper edge with a rectangular hood member 21' adapted to fit over the adjacent rectangular part of the axle so as to prevent turning of the cap. There is also provided on the opposite side a hood segment 21" adapted to fit the curvature of the inner end of the hub whereby dust is excluded. The outer hub-cap 22 is provided with a similar inwardly projecting hood 22' adapted to fit the outer end of the hub, the outer face of said cap 22 being provided with a flange 22" notched at 23 in a vertical direction to receive a cotter pin 24 which secures the wheel in place and prevents turning of the cap. Said flange 22' is also notched in a horizontal direction at 25 to eliminate unnecessary metal and so lighten and correspondingly lower the cost of the cap.

The truck body is adapted especially to carry heavy machinery, as for instance, an internal combustion engine (not shown), as will be understood. It comprises the pair of spaced longitudinal side bars or sills 8, cushion blocks 27, preferably of wood, one on each sill to carry the main load, and flooring 27' thereon. Each sill consists of a bent angle bar and includes a low rear part 8', a high front part 8", and inclined medial part 28 formed integrally, and a medial reinforcement member 29. The bends at 28' and 28" are forged and the metal of the flanges correspondingly up-set on the concave side and stretched on the convex side at these points, the metal being up-set on the upper side at 28' and on the lower side at 28". These sills 8 may be shaped in a "bulldozer" as will be understood. Said member 29 is preferably in the form of a sheet-metal plate sheared or otherwise cut to the required shape and disposed in a vertical plane. It is formed relatively deep at 29' near its center and serves efficiently as a truss member. It lies snugly against the medial part 28 of sill 8, being secured rigidly to the vertical flange 8ª, as for instance by means of rivets 30. Said sills may to advantage be disposed at a slight angle, diverging toward the rear end. The vertical flange of each sill 8 is apertured to receive the main body of the rear axle which fits squarely and rigidly in the rectangular perforation or mortise 8ᵇ where it is secured by a bolt 30 as shown in Fig. 11.

The method of assembling the axle and fifth wheel parts and securing the king-pin in place is as follows: The king-pin is applied to the axle 6 by driving the part 5ª into the aperture 16. The bar 10 is then applied to the axle by threading the pivotal projection 5ᵇ through the middle aperture of said bar and then clamping the ends in place by fasteners 14 after having adjusted the dowels 19 by driving same tightly into place in the axle. The brace 10 is secured by forcing the bar ends downward tightly onto the axle 6 and dowels 19. The king-pin is thus secured and braced permanently and rigidly in place. The body of the vehicle is then secured to the front axle by lowering the front end thereof with the middle aperture of bolster 3 in registry with the upwardly projecting tip 5ᵇ of the king-pin. When said tip has been threaded into place the nut 18 is applied and secured by the pintle 17, with sufficient clearance between the bolster part 11 and said nut to avoid binding or interference in turning the vehicle. The dowels 19 not only prevent the plate 10 from working sidewise, but especially prevent endwise movement thereof, thus effectively bracing the king-bolt 5. The lower ends of said dowels are relatively large and fit snugly in the axle apertures 31. By this arrangement, a strong and rigid fifth wheel device is provided with a very light form of construction. The weight carried by the bolster is transmitted to the axle through the enlarged body 5' of the king-pin, supplemented by the bracing effect of the bar 10, whereby a permanent and rigid assemblage is provided without materially weakening the axle on account of the king-pin.

Although but one specific embodiment of this invention has been herein shown and described, it will be understood that numerous details of the construction shown may be altered or omitted without departing from the spirit of this invention as defined by the following claims.

I claim:

1. A truck of the character described, including a front axle having a plain bar adapted to be formed from rolled stock, disposed lengthwise on its upper side, said bar being bowed upward medially and its tips being turned upward adjacent to its corresponding bearing points where the bar is secured to the axle, a forked tongue having rearwardly divergent arms pivotally connected to the upturned tips of said bar respectively for vertical swinging thereon, and a king-pin for securing the body of the truck to the middle part of said bar and axle.

2. A device of the character described, comprising a front axle, a bar disposed substantially horizontally on the upper side of said axle, the middle part being bowed upward and spaced somewhat therefrom, a king-pin extending through the middle of said bar and resting on said axle and including a shouldered middle part whereby said bar and axle are supported rigidly in spaced relation at the center, dowel pins the lower ends of which are relatively large and set in said axle, the smaller ends being set in the outer ends of said bar, and clamping means for holding the outer ends of said bar down against said axle.

3. A device of the character described, comprising a front axle, a bar disposed substantially horizontally on the upper side of said axle, the middle part being bowed upward and spaced somewhat therefrom, a king-pin extending through the middle of said bar and resting on said axle and including a shouldered middle part whereby said bar and axle are held in spaced relation at the center, clamping means to hold the outer ends of said bar down against said axle, and means positively engaging the end bearing parts of said bar with said axle to prevent relative endwise movement of said axle and end bearing parts.

Signed at Roodhouse this 23rd day of July, 1918.

WILLIAM E. SULLIVAN.